United States Patent
Fuehrer et al.

(10) Patent No.: US 7,362,834 B2
(45) Date of Patent: Apr. 22, 2008

(54) METHOD AND DEVICE FOR SYNCHRONIZING AT LEAST ONE NODE OF A BUS SYSTEM AND A CORRESPONDING BUS SYSTEM

(75) Inventors: Thomas Fuehrer, Gerlingen (DE); Bernd Mueller, Leonberg (DE); Florian Hartwich, Reutlingen (DE); Robert Hugel, Karlsruhe (DE)

(73) Assignee: Robert Bosch GmbH, Stuttgart (DE)

( * ) Notice: Subject to any disclaimer, the term of this patent is extended or adjusted under 35 U.S.C. 154(b) by 521 days.

(21) Appl. No.: 10/471,953

(22) PCT Filed: Mar. 13, 2002

(86) PCT No.: PCT/DE02/00872

§ 371 (c)(1),
(2), (4) Date: Mar. 26, 2004

(87) PCT Pub. No.: WO02/076031

PCT Pub. Date: Sep. 26, 2002

(65) Prior Publication Data

US 2004/0156462 A1 Aug. 12, 2004

(30) Foreign Application Priority Data

Mar. 15, 2001 (DE) ............... 101 12 908
Feb. 28, 2002 (DE) ............... 102 08 650

(51) Int. Cl.
*H04L 7/00* (2006.01)

(52) U.S. Cl. ............ 375/354; 375/355; 713/400; 713/600

(58) Field of Classification Search ......... 375/354, 375/355, 359, 371, 373; 370/503; 713/400, 713/600; 327/144, 141
See application file for complete search history.

(56) References Cited

U.S. PATENT DOCUMENTS 5,070,517 A * 12/1991 Kochler et al. ......... 375/369

(Continued)

FOREIGN PATENT DOCUMENTS

DE 198 48 950 4/2000

(Continued)

OTHER PUBLICATIONS

Fuehrer et al., *Time Triggered Communication on CAN (Time Triggered CAN —TTCAN)*, Proc. of the International CAN Conference, 2000, pp. 1-7.

*Primary Examiner*—Chieh M. Fan
*Assistant Examiner*—Aristocratis Fotakis
(74) *Attorney, Agent, or Firm*—Kenyon & Kenyon LLP

(57) ABSTRACT

Method of synchronizing at least one user of a bus system which is operated with a preselectable system clock period (NTU), a local clock period (LNTU) and a reference clock period (GNTU) being preselected for the at least one user, and the reference clock period (GNTU) being synchronized with the system clock period (NTU), a local clock period (SLNTU), synchronized with the system clock period (NTU), of the at least one user being generated by linking the local clock period (LNTU) to a scaling factor (P), the scaling factor (P) reflecting a ratio of the reference clock period (GNTU) to the local clock period (LNTU), the scaling factor (P) for synchronization of the local clock period (LNTU) being adapted to the system clock period (NTU) by addition or subtraction of an adjustment value (O).

13 Claims, 3 Drawing Sheets

U.S. PATENT DOCUMENTS

| | | | |
|---|---|---|---|
| 5,498,998 A * | 3/1996 | Gehrke et al. | 331/17 |
| 5,726,973 A * | 3/1998 | Isaksson | 370/203 |
| 6,049,614 A * | 4/2000 | Kim | 380/263 |
| 6,121,816 A * | 9/2000 | Tonks et al. | 327/296 |
| 6,754,745 B1 * | 6/2004 | Horvath et al. | 710/58 |
| 7,035,246 B2 * | 4/2006 | Taylor | 370/350 |

FOREIGN PATENT DOCUMENTS

| | | |
|---|---|---|
| DE | 199 36 944 | 2/2001 |
| DE | 100 00 302 | 7/2001 |
| DE | 100 00 303 | 7/2001 |
| DE | 100 00 304 | 7/2001 |
| DE | 100 00 305 | 7/2001 |

* cited by examiner

METHOD AND DEVICE FOR SYNCHRONIZING AT LEAST ONE NODE OF A BUS SYSTEM AND A CORRESPONDING BUS SYSTEM

FIELD OF THE INVENTION

The present invention relates to a method and a device for synchronizing at least one user of a bus system, and also to a bus system.

BACKGROUND INFORMATION

Networking of controllers, sensors and actuators with the help of a communication system, a bus system, has increased drastically in recent years in the construction of modern motor vehicles and in machine construction, in particular in the machine tool sector and in automation. Synergistic effects due to the distribution of functions among a plurality of control units may also be achieved in this way. These are known as distributed systems. Communication between different stations is increasingly being accomplished via a bus or bus system. Communication traffic on the bus system, access and reception mechanisms as well as error processing are regulated according to a protocol.

The CAN (controller area network) protocol has become established in the automotive sector. This is an event-controlled protocol, i.e., protocol activities such as sending a message are initiated by events originating outside the communication system. Definite access to the communication system, i.e., bus system, is achieved by priority-based bit arbitration. This requires that each message be assigned a definite priority. The CAN protocol is very flexible, so it is readily possible to add additional nodes and messages as long as there are still free priorities (message identifiers). The collection of all messages to be sent in the network together with their priorities and sender nodes as well as possible reception nodes are stored in a list known as the communication matrix.

An alternative approach to spontaneous, event-controlled communication is the strictly time-controlled approach. All communication activities on the bus are strictly periodic. Protocol activities such as sending a message are triggered only by the passing of time, which is valid for the entire bus system. Access to the medium is based on the allocation of time ranges in which one sender has exclusive sending right. The protocol is comparatively inflexible; new nodes may be added only if the corresponding time intervals have been freed up in advance. This circumstance requires that the order of messages be determined even before starting operation. Thus, a schedule is compiled which must meet the requirements of the messages with respect to repeat rate, redundancy, deadlines, etc. This is known as a bus schedule. Positioning of the messages within the transmission periods must be coordinated with the applications produced by the message contents to minimize the latencies between application time and transmission time. If this coordination does not take place, the advantage of time-controlled transmission (minimum latency jitter in sending the message on the bus) is lost. High demands are thus made of the scheduling tools.

German Published Patent Application No. 100 00 302, German Published Patent Application No. 100 00 303, German Published Patent Application No. 100 00 304 and German Published Patent Application No. 100 00 305 describe approaches to time-controlled CAN, namely TTCAN (time triggered controller area network) which complies with the requirements outlined above with regard to time-controlled communication as well as the demand for a certain measure of flexibility. TTCAN meets this by establishing a communication cycle (basic cycle) in exclusive time windows for periodic messages of certain communication stations and in arbitrating time windows for spontaneous messages of a plurality of communication stations.

In addition, a TTCAN network as a bus system is assumed, but this is not to be understood as restrictive with regard to the subsequent object of the present invention. Instead, the object of the present invention, which is to be explained below, may also be used with other comparable bus systems.

In doing so, a uniform clock pulse must be derived from the various internal local clock pulses of the users, in particular the control units, for the communication network, i.e., the bus system in networked control units in automation, in motor vehicles and in other areas of use, for example, or the individual starting clocks of the users must be synchronized to such a uniform common network clock, e.g., the network time unit NTU for TTCAN.

The usual method of forming a local clock adapted to the reference clock and/or the system clock from a reference clock and in particular a faster system clock is based on counting how many system clock periods are in a certain number of reference clock periods, known as the measurement period. The numerical value then indicates how many system clock periods form the local clock to be adapted. The measurement period is usually constant and limited to values of $2^n$ reference clock periods ($n \in N_0$). This adjustment or synchronization is performed by defining a scaling factor which is linked to the local clock to generate a synchronized local clock. To do so, multiplication and division must be implemented to determine the new scaling factor. In particular in the case of a hardware implementation, multiplication and division are very complex to handle.

Therefore, the goal of the present invention is to provide a general method, a device and a corresponding bus system by which synchronization of a user, i.e., adjustment of a local clock and/or a local clock period of such a user, may be performed easily without the length of the measurement period having to remain constant or being limited to certain values.

SUMMARY OF THE INVENTION

The present invention describes a general method and a device and a corresponding bus system by which an adjustment of a local clock to a reference clock and/or the system clock may be performed easily, in particular without multiplication or division, thereby greatly facilitating an adjustment, i.e., synchronization of a local clock and/or a local clock period and/or the local representation of the network clock with a reference clock or system clock, and this is accomplished with less complex hardware, so that integration into an IC (integrated circuit) in particular is greatly facilitated.

In addition, the lengths of the measurement periods are also referred to below as "measurement time windows" during which the deviations between the reference clock and/or the reference clock period and the local clock and/or the local clock period which is to be adjusted are measured, are allowed to change, i.e., they need not be constant, and they are not limited to certain predetermined values.

This is achieved by a method and a device as well as a bus system having a device for synchronizing at least one user of a bus system which is operated with a preselectable system clock period (NTU), a local clock period (L_NTU) and a reference clock period (G_NTU) being preselected for the at least one user, and the reference clock period (G_NTU) being synchronized with the system clock period (NTU); a local clock period (SL_NTU), synchronized with the system clock period (NTU), of the at least one user is generated by linking the local clock period (L_NTU) to a scaling factor or prescaler (P); the scaling factor or prescaler (P) reflecting a ratio of the reference clock period (G_NTU) to the local clock period (L_NTU), the scaling factor, i.e., prescaler (P) for synchronization of the local clock period (L_NTU) being advantageously adapted to the system clock period (NTU) by addition or subtraction of an adjustment value or offset (O). In other words, this adjustment value is added or subtracted, depending on whether the offset, i.e., the adjustment value O is greater than or less than 0. In the special case when no adjustment is necessary, the value 0 may be obtained as the adjustment value or offset.

A measurement time window MT is advantageously preselected by a recurring event, although it need not necessarily recur periodically, this measurement time window MT being determined first in a number of local clock periods L_NTU as a unit as a first local measurement window as local_period and in a number of reference clock periods G_NTU as an additional unit as a second global measurement window, as global_period; a difference period_diff being determined from the first measurement window, i.e., the local_period, and the second measurement window, the global_period, the adjustment value or offset O being determined with the help of this difference period_diff.

Offset O is advantageously also determined as a function of a ratio of the scaling factor or prescaler P to the second measurement window, the global_period, the ratio being represented using dual logarithms, which advantageously permits a rounding of the dual logarithm of scaling factor LDP and the dual logarithm of second measurement window LD global_period, so that in a binary representation, instead of the complete dual logarithm, the value of the highest position in binary representation is used, thus expediently yielding a difference DLD according to the particular highest position of the rounded-off value for scaling factor LDPR and the rounded-off value of second measurement window LDGB.

Through such a procedure of conversion to dual logarithms and rounding off, it is possible to avoid overshooting while also achieving a better convergence of the method. Difference DLD between the rounded-off value for scaling factor LDPR and the rounded-off value for second measurement window LDGP is expediently formed according to equation 19: DLD=(LDPR−LDGP)−1.

A further advantageous increase in convergence may be achieved by the difference DLD being formed according to equation 20: DLD=(LDPR−LDGP).

The adjustment value or offset O is advantageously formed so that the difference between the first and second measurement windows, i.e., period_diff, in binary representation is shifted by individual positions of the binary representation according to difference DLD of the rounded-off values for scaling factor and second measurement window LDPR and LDGP in the case of a positive difference DLD in the direction of the highest position, or in the case of a negative difference it is shifted in the direction of the lowest position. Therefore, multiplication and division are advantageously converted to addition and a shift function, permitting a simple and thus inexpensive hardware implementation, in particular in an IC.

Through the method according to the present invention and/or the corresponding device and bus system, a plausibility check is also advantageously performable in such a way that offset O and/or the sum of the offset and of prescaler P and/or the difference between offset O and prescaler P may be compared with at least one preselectable threshold value.

The at least one preselectable threshold value may be preselected as a maximum value, for example, and on reaching and/or exceeding this maximum value, further synchronization by adapting offset O is suppressed or the offset and/or the sum of offset O and of the prescaler, i.e., scaling factor P, is limited to the maximum value.

Likewise the at least one preselectable threshold value may be advantageously preselected as a minimum value and on reaching and/or falling below this minimum value, further synchronization by adapting offset O is not performed or the adjustment value itself, i.e., offset O and/or the difference between the offset and the scaling factor, i.e., prescaler P, is limited to the minimum value.

DETAILED DESCRIPTION

Figure 1:
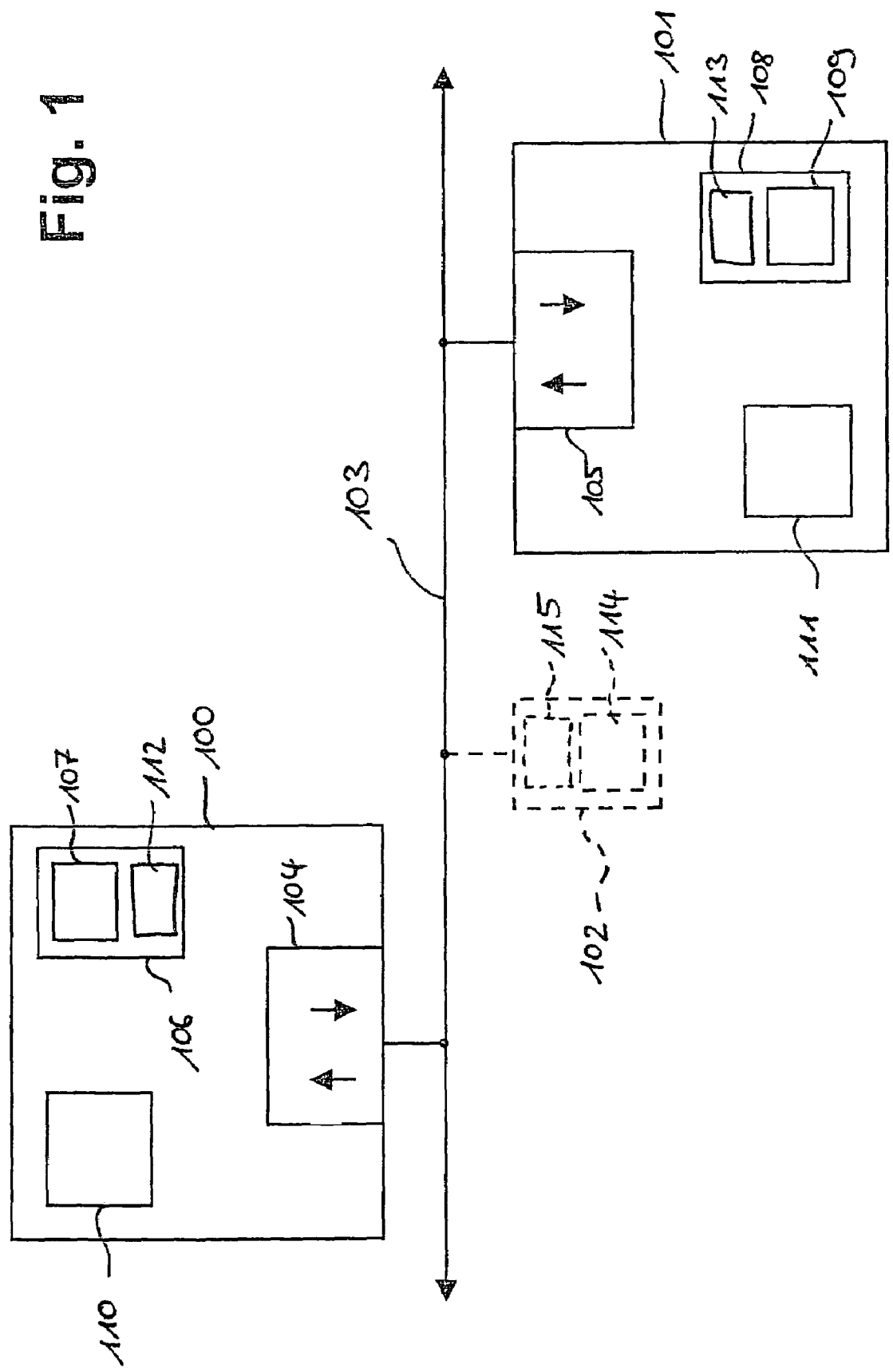
FIG. 1 shows a network or bus system having at least one first user and second means, in particular a second user for preselecting a reference clock and/or a reference clock period.

FIG. 1 shows a bus system 103 having a first user 100 and another user 101. First user 100 is described below as the user to be synchronized; this also shows an interface element 104 for communication link 103. A clock generator 106 having an internal clock source, e.g., a quartz crystal 107, is also shown. Furthermore, clock generator 106 includes a counter 112. A component 110 is also illustrated by which synchronization of the user and/or adjustment of the clock may be implemented. This component 110 and/or the corresponding functionality may optionally also be accommodated in clock generator 106. User 101 is referred to below as a reference generator, in the specific case of a TTCAN system it is known as the time master which is connected via an interface module 105 to communication link 103. Clock generator 108 of the reference user, the time master in the TTCAN system through which the local time of this time master is determined, is thus considered the reference time for the entire bus system. In other words, local time generator 108 of reference user 101 is thus considered a global time generator of the bus system. Here again a local clock source 109, in particular a quartz crystal or some other time source, is also shown. Here again there is a counter 113 for acquiring the local time source. This also shows another optional component 111, e.g., a processing module or a processor by which messages may be sent and received and/or analyzed. Optionally instead of using a reference user 101, a reference clock generator 102 may also be connected to the communication link, likewise with time source 114 and counter module 115, for example. Thus, the reference time for communication link 103 and/or the entire bus system may also come from simple second means, i.e., a simple timer module, instead of a reference user.

The basis of the clock adjustment is a recurring event, in particular a regularly recurring event, but it need not recur absolutely periodically, i.e., at equidistant intervals, which is observable in all nodes of a network and may function as a reference point for preselection of the measurement time window, i.e., the measurement period. In the remaining discussion, the term "measurement time window" or "measurement window" is preferably used, because as already pointed out, a periodicity of this measurement time window, and thus also a measurement period, is not absolutely necessary although it is possible. Events for defining this measurement time window are events observable simultaneously in the time master, i.e., reference user 101 and the at least one time slave, i.e., user 100 which is to be synchronized, as is the case, e.g., in the TTCAN network with the start of frame of the reference message. User 101, which supplies the reference clock, i.e., the reference clock period and increments a counter, in particular counter 113 using this reference clock, i.e., corresponding period, then sends the count of counter 113 which has been confirmed for this specific measurement event to all other users, in particular user 100, which capture for the same measurement event the counter reading of the local counter, e.g., 112, which is incremented with its local clock from clock source 107. The counter readings may be captured, by saving in memories or registers which are not represented explicitly, these memories or registers being present in particular in timer 106 or 108 or in other modules, e.g., 110 or 111 or even separately. The differences between the counts captured for these successive measurement events then indicate the length of the measurement period in the reference clock periods, i.e., in the unit of the reference clock, and, in the case of the user to be synchronized, in local clock periods, i.e., in the unit of the local clock period.

In addition to the quartz crystal, an oscillator, in particular a VCO, may also be used as the clock source, i.e., the time source.

The reference clock of reference generator 101 is referred to below as global timing GT. The local clock to be adjusted to the reference clock and/or the system clock, i.e., the local clock to be synchronized with it, is referred to in the remaining discussion as local timing LT. The period of reference clock GT is G_NTU and the period of local clock LT is L_NTU. The scaling factor or prescaler P, in particular actual value P_actual or prescaler_actual, indicates how many system clock periods are contained in a certain number N, which is usually large. $\epsilon N$, of local clock periods L_NTU, where N is a constant which determines the ratio of the prescaler, i.e., scaling factor P, and local clock period L_NTU. The length of the measurement period, represented or measured in units of the period of reference clock pulse G_NTU, is measured, i.e., detected, as global_period and the pendant, i.e., the length of the measurement time window, is measured, i.e., detected, as local_period in units of local clock period L_NTU. Thus, global_period and local_period are the measurement windows, i.e., the corresponding values which are then used to determine the deviation of local period L_NTU from global period G_NTU. The deviation itself, i.e., the difference between local_period and global_period, is referred to as period_diff. According to the present invention, an offset or adjustment value is added to or subtracted from the prescaler or the scaling factor to achieve the result that L_NTU and G_NTU do not differ from one another and/or the synchronized local clock generated with the help of the prescaler and offset, i.e., synchronized local clock period SL_NTU is synchronized with the reference clock, i.e., the system clock, in particular it corresponds to the reference clock, i.e., reference clock period G_NTU.

All the values mentioned here are integrals, which further simplifies the implementation.

Figure 2:
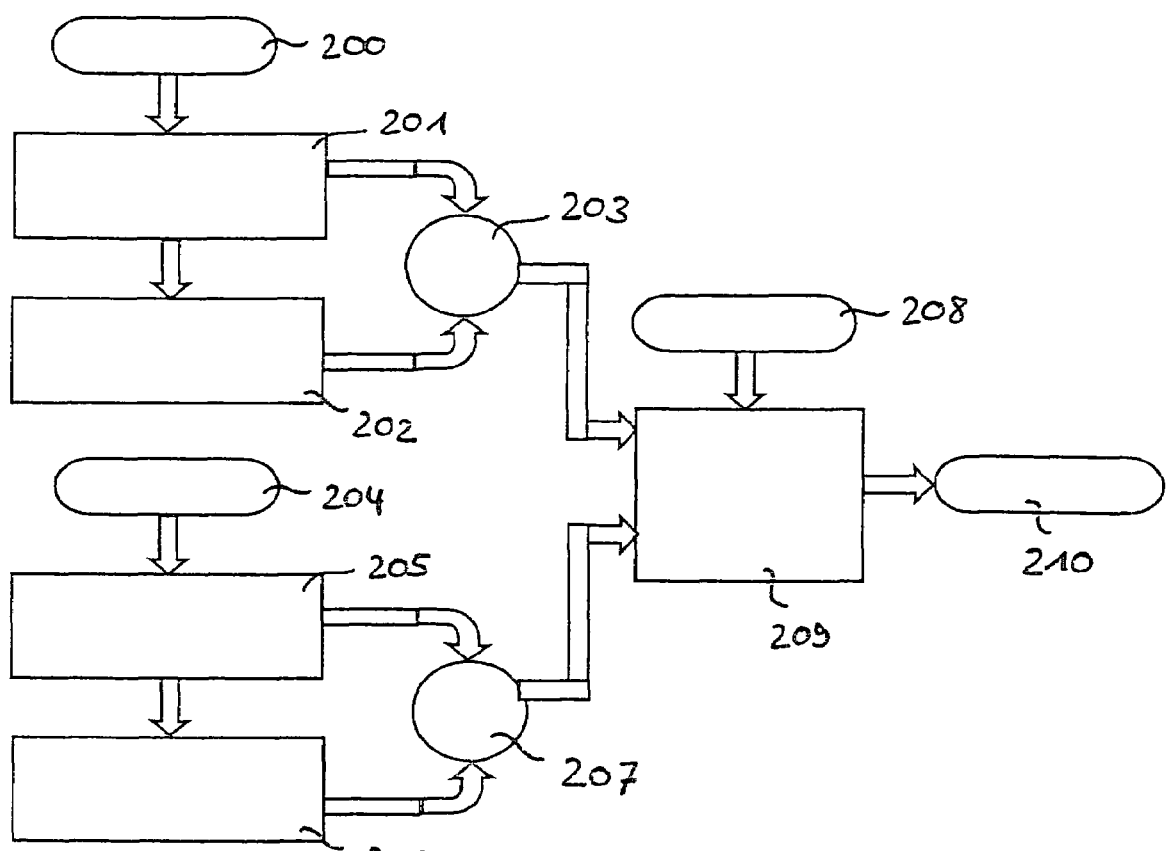
FIG. 2 shows a flow chart for forming the scaling factor or prescaler and the adjustment value or offset having a first measurement window local_period and a second measurement window global_period.

FIG. 2 illustrates the synchronization, i.e., adjustment, in detail, whereby the adjustment may be repeated regularly to compensate for fluctuations in the system clock, i.e., system clock period, and reference clock, i.e., reference clock period.

In FIG. 2, the reference message, i.e., according to the present invention the counter value of reference user 101, in block 201 is detected by block 200 as the instantaneous reference value in block 201, e.g., on occurrence of the first measurement event. If the second measurement event occurs as a recurring event, then the value which was previously the instantaneous value from block 201 is written to block 202 as the preceding or previous reference value, and the counter value of the recurring measurement event remains as the current value in block 201. The same thing is also true of blocks 204, 205 and 206 for the user which is to be synchronized and which ensures its current counter value in block 205 for the measurement event and, on occurrence of the recurring measurement event, transmits this value from block 205 to block 206 and writes the new counter value for the measurement event as the current value to block 205. In other words, in this example the system first waits for the two measurement events, namely the measurement event occurring first and the recurring event, to then have a current value and a previous value with which the measurement time window is determinable, i.e., the difference may be formed.

Another possibility is to provide as the first event a constant and to accept this constant as the previous value into blocks 202 and 206 and then write the first measurement event, i.e., the corresponding counter value, as the current value to block 201 and/or block 205 for the reference user and/or to the users to be synchronized.

Another possibility would be to set both values, i.e., the current value and the previous value, at constant values in blocks 201 and 202 or 205 and 206 before the first measurement event, so that then a first predetermined difference is used for global_period and local_period, i.e., the measurement window.

In the case of a TTCAN system, the start occurs with the start of the basic cycle, the counter values being captured at the start of frame of the TTCAN.

Thus in general, when a new counter value arrives, the previous counter value is saved as the previous value according to the measurement event that occurs, so that a new difference may be formed with the new counter value. Thus, for each measurement event, the measurement window local_period, i.e., the difference between the counter values for the measurement events from blocks 205 and 206 and the measurement window global_period, i.e., the difference between the counter values of the reference user and the measurement events in block 201 and block 202, must be determined anew. This difference is formed in block 203, so that the global_period, i.e., the second measurement window, is formed here, and the local_period, i.e., the first measurement window, is formed in block 207. Both measurement window values, i.e., in units of reference time periods and/or reference clock periods and local clock periods, are then sent to block 209. Block 209 also receives via block 208 the previous scalar ratio, scaling factor P and/or P_actual or prescaler_actual which enters into the subsequent determination of the new scaling factor or prescaler_setpoint in block 209.

First in block 209 the two values local_period and global_period are compared by forming period_diff, which means that when period_diff is not equal to 0, L_NTU must be adjusted to G_NTU.

According to the present invention, this adjustment is performed by adding an offset O, an adjustment value, to the current prescaler value, prescaler_actual or P_actual, to arrive at the new prescaler value prescaler_setpoint or P_setpoint, i.e., P. Offset O may be either positive or negative or even zero in the case of period_diff=0. This depends on the sign of period_diff.

By definition the following equations always hold according to the present invention:

$$\text{global\_period} * G\_NTU = \text{local\_Period} * L\_NTU \quad \text{(equation 1)}$$

$$G\_NTU = L\_NTU * \text{local\_period} / \text{global\_period} \quad \text{(equation 2)}$$

$$N * L\_NTU = P\_actual * NTU \text{(system clock period)} \quad \text{(equation 3)}$$

$$N * G\_NTU = P\_setpoint * NTU \quad \text{(equation 4)}$$

This yields by rearranging:

$$P\_setpoint = P\_actual * \text{local\_period} / \text{global\_period} \quad \text{(equation 5)}$$

with the switch in the correction factor to an offset. To arrive at an easily implementable hardware embodiment, the result to be achieved now is that:

$$P\_setpoint = P\_actual + O \quad \text{(equation 6)}.$$

Thus the previous equations yield the following for offset O:

$$O = P\_actual * \text{local\_period} / \text{global\_period} - P\_actual \quad \text{(equation 8)}$$

and $$O = P\_actual * (\text{local\_period} / \text{global\_period} - 1) \quad \text{(equation 9)}.$$

With the definition already proposed for the difference period_diff from local_period and global_period:

$$\text{period\_diff} = \text{local\_period\_global\_period} \quad \text{(equation 10)}$$

and the representation of the offset $$O = P\_actual * (((\text{period\_diff} + \text{global\_period}) / \text{global\_period}) - 1) \quad \text{(equation 11)}$$

$$O = P\_actual * \text{period\_diff} / \text{global\_period} \quad \text{(equation 12)}$$

this yields the following for the offset $$\text{offset} = \text{period\_diff} * (P\_actual / \text{global\_period}) \quad \text{(equation 13)},$$

i.e., the value of the offset or adjustment value O depends on the difference period_diff and the ratio of P_actual to global_period, as already described in the advantages of the invention and in the claims. Now according to the present invention the quotient P_actual to global_period is formed via dual logarithms:

$$P\_actual / \text{global\_period} = 2^{ld(P\_actual) - ld(\text{global\_period})} \quad \text{(equation 14)}.$$

To arrive at a more extensive hardware-friendly adjustment, according to the present invention the dual logarithms ld(P_actual) and ld(global_period) are rounded off to integers, i.e., instead of the complete dual logarithm, the value of the highest position in this binary representation is used for the particular values in binary representation, i.e., the highest bit of this number, so that value ldPr is obtained for the dual logarithm of scaling factor ld(P_actual), and value ldGP is obtained for the dual logarithm of second measurement window ld(global_period), where ldPr≦ld(P_actual) and ldGP≦ld(global_period). Thus the difference from equation 14 with the rounded-off values, i.e., the integers corresponding to the highest bits of the dual logarithm, is obtained the equation:

$$Dld = (ldPr - ldGP) - 1 \quad \text{(equation 19)}$$

where it holds that:

$$(P\_actual / \text{global\_period}) / 4 \leq 2^{Dld} \leq P\_actual / \text{global\_period} \quad \text{(equation 15)}.$$

As an additional adjustment according to the present invention, the following is thus also obtained for the offset:

$$O = \text{period\_diff} * 2^{Dld} = \text{shift}(\text{period\_diff}, Dld) \quad \text{(equation 16)}.$$

In other words, the offset may be represented by a shift function, which means that the difference between the first and second measurement windows, i.e., period_diff, in binary representation is shifted accordingly by individual positions in the binary representation according to the difference Dld of the rounded-off value for scaling factor ldPr of the rounded-off value of second measurement window ldGP accordingly. In the case of a positive difference Dld in the direction of the highest position, which would correspond here to a shift_left function, or in the case of a negative difference Dld in the direction of the lowest position, which would correspond to a shift_right function, assuming the highest bits are represented at the left and the lowest bits are represented at the right. In the inverse representation the shift function may be used accordingly. This yields the following for new scaling factor P. i.e., P_setpoint using the offset thus found:

$$P\_setpoint = P\_actual + \text{shift\_left}(\text{period\_diff}, Dld) \quad \text{(equation 17)},$$

with which the multiplication and division have been converted to a shift function and addition. It is readily possible according to the present invention to achieve a hardware-friendly adjustment for determination of scaling factor P, i.e., P_setpoint so that it is easily implementable in an IC.

The correction established by the offset or adjustment value O always has the correct sign (see equations 13 and 16). The correction advantageously does not go beyond the target value itself because overshooting is impossible due to equation 15. The clock adjustment presented here is performed after each measurement event, at least one quarter of the remaining deviation being corrected each time as part of the measurement and adjustment accuracy until remaining period_diff converges toward 0. If reference clock period G_NTU is not an integral multiple of system clock period NTU, then in this special case, period_diff will not remain at 0, but instead it will remain in a small interval around the value 0.

As an alternative, difference Dld of the rounded-off dual logarithms may also be estimated for equation 15 as $$Dld = (dlpr - dlGP) \quad \text{(equation 20)}$$

where it then holds that:

$$(P\_actual / \text{global\_period}) / 2 \leq 2^{Dld} \leq P\_actual / \text{global\_period} \quad \text{(equation 18)}.$$

This alternative estimate converges even more quickly than the estimate in forming the difference according to equation 19.

According to the present invention, all methods and/or the corresponding devices and bus systems which use an adjustable variable to adjust a local clock and/or a local clock period to a reference clock, i.e., a reference clock period according to the system clock, i.e., the system clock period, are covered by the present invention. This means that the adjustment to the reference clock period, i.e., the reference clock is implementable by adding a value, i.e., an adjustment value, in particular an offset, to this adjustable variable, whereby an adjustment value is determined for the adjustment value using rounded dual logarithms of the available variables.

Another advantage derived from the method and/or device according to the present invention and the bus system is the possibility of implementing a plausibility check in which the adjustment value, i.e., offset O and/or the sum or difference of the scaling factor prescaler P_actual and the offset are compared with a predetermined threshold value, in which case the clock adjustment may then either be omitted or limited to the threshold value if the calculated offset exceeds or falls below the threshold value. In other words, the sum or difference of P_actual and offset may be compared with a threshold value, depending on the sign of the offset or the offset itself, this threshold value being implementable as a maximum or minimum in particular.

In the case of a preselected maximum value as the threshold value, on reaching and/or exceeding this maximum value, either the clock adjustment is stopped, i.e., there is no further adjustment of the adjustment value, or the adjustment value, i.e., the sum of P_actual and offset, is limited to this maximum value according to the sign of the offset. The same thing also holds on reaching or falling below a minimum value as the threshold value. The clock adjustment may be suppressed here or limited to the minimum value.

FIG. 3 shows again briefly on the basis of a time stream the transfer of values and determination of the scaling factor. At time T0/1 the event which is globally observable in the entire bus system occurs. In other words, at this point in time, the reference user captures its counter value and the other users capture the counter value of their local counter. These capture values or captured counter values become valid at time T1/1 in block 2. Likewise at this point in time the old current value becomes the previous value. In other words, the reference counter value detected at T0/1 or in block 1 is made known to the other users via communication link 103. At time T2/1 or in block 3, the scaling factor, i.e., the P setpoint value, is calculated again, i.e., redetermined, by adding the offset to the P actual value as described in conjunction with FIG. 2. In the TTCAN system, for example, this scaling factor is known as TUR time unit ratio. Aforementioned blocks 1, 2, and 3 are then repeated at times T0/2, T1/2, and T2/2. This cycle then begins again with block 1 at T0/3.

Figure 3:
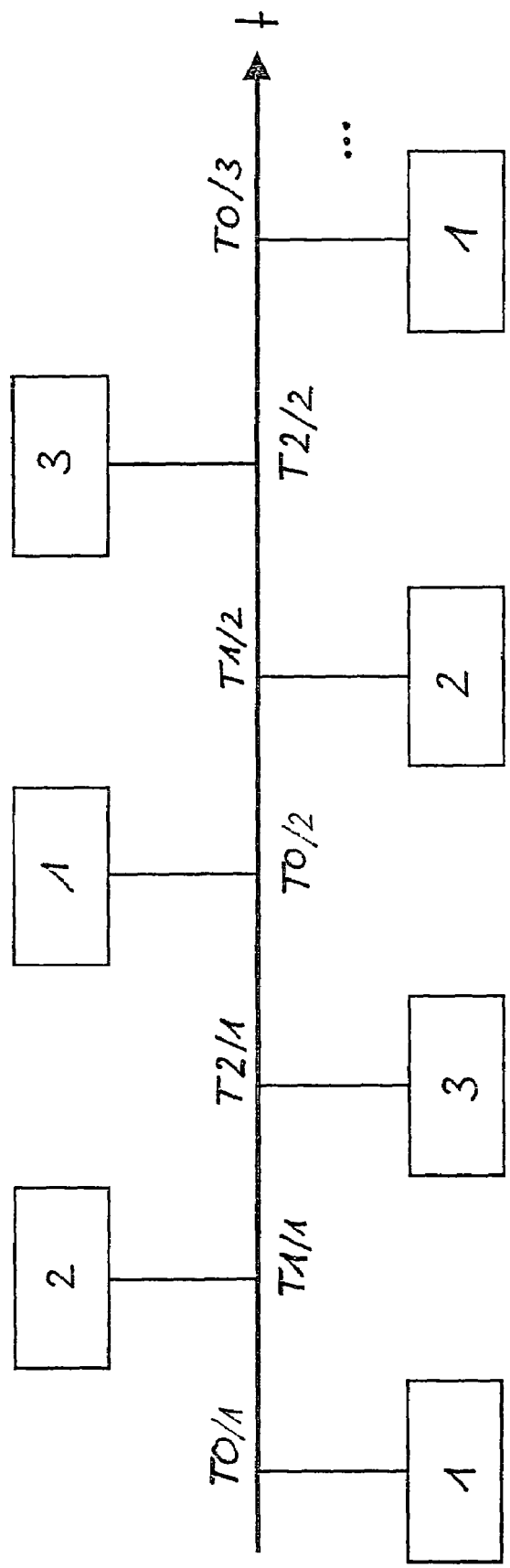
FIG. 3 shows again a time representation of the clock adjustment and/or the clock period adjustment, i.e., synchronization of the at least one user via a time stream.

By applying this method as also illustrated in FIG. 3, the error, i.e., the clock difference, i.e., the clock period difference or the speed difference converges toward 0. Depending on the application of the convergence equation with difference Did [this occurs] slightly more rapidly or not as rapidly with the guarantee of no overshooting period.

Thus, the method and the corresponding device as well as the bus system having the corresponding device make do without multiplication or division, which involve complex hardware and would require a great implementation complexity. In addition, a very simple plausibility check of the values thus determined is made possible, as described above. In addition, this method also advantageously converges geometrically, i.e., very rapidly, for all practical applications. Thus advantageously minor changes in the target value may be pursued very rapidly and very smoothly. On an IC for example the clock regulating method as described here is detectable by measuring the input clock and the output clock of the IC and/or the functions of the IC controlled by the output clock.

What is claimed is:

1. A method of synchronizing at least one user of a bus system that is operated with a preselectable system clock period, comprising:
   preselecting a first local clock period and a reference clock period for the at least one user;
   synchronizing the reference clock period with the preselectable system clock period;
   generating another local clock period of the at least one user by linking the first local clock period to a scaling factor, the scaling factor reflecting a ratio of the reference clock period to the first local clock period;
   synchronizing said another local clock period with the preselectable system clock period; and
   adapting the scaling factor to the system clock period by one of adding and subtracting an adjustment value.

2. The method as recited in claim 1, further comprising:
   preselecting a measurement time window by a recurring event;
   determining the measurement time window in a number of local clock periods of the at least one user as a first local measurement window and in a number of reference clock periods as a second global measurement window; and
   determining a period difference from the first local measurement window and the second global measurement window, the adjustment value being determined as a function of the period difference.

3. A method of synchronizing at least one user of a bus system that is operated with a preselectable system clock period, comprising:
   preselecting a first local clock period and a reference clock period for the at least one user;
   synchronizing the reference clock period with the preselectable system clock period;
   generating another local clock period of the at least one user by linking the first local clock period to a scaling factor, the scaling factor reflecting a ratio of the reference clock period to the first local clock period;
   synchronizing said another local clock period with the preselectable system clock period;
   adapting the scaling factor to the system clock period by one of adding and subtracting an adjustment value;
   preselecting a measurement time window by a recurring event;
   determining the measurement time window in a number of local clock periods of the at least one user as a first local measurement window and in a number of reference clock periods as a second global measurement window; and
   determining a period difference from the first local measurement window and the second global measurement window, the adjustment value being determined as a function of the period difference,
   wherein the adjustment value is also a function of a ratio of the scaling factor to the second global measurement window, and
   the ratio is mapped using dual logarithms, including a dual logarithm of the scaling factor and a dual logarithm of the second global measurement window, the dual logarithms being rounded off so that in binary representation, instead of the complete dual logarithms, a value of the most significant bit in binary representation is used, yielding a difference Dld according to the most significant bit of the rounded-off value for the scaling factor and the rounded-off value of the second global measurement window.

4. The method as recited in claim 3, wherein:
the difference Dld between the rounded-off value for the scaling factor and the rounded-off value of the second global measurement window is formed from $$Dld=(ldPr-ldGP)-1, \text{ and}$$

ldPr corresponds to the rounded-off value for the scaling factor and ldGP corresponds to the rounded-off value for the second global measurement window.

5. The method as recited in claim 3, wherein:
the difference Dld between the rounded-off value for the scaling factor and the rounded-off value of the second global measurement window is formed from $$Dld=(ldPr-ldGP), \text{ and}$$

ldPr corresponds to the rounded-off value for the scaling factor and ldGP corresponds to the rounded-off value for the second global measurement window.

6. The method as recited in claim 3, wherein:
the adjustment value is formed so that the period difference is shifted by individual positions of a binary representation according to the difference Dld of the rounded-off value for the scaling factor and the rounded-off value of the second global measurement window,
wherein the period difference is shifted in the case of the difference Dld being positive in the direction of the most significant bit, and
the period difference is shifted in the case of the difference Dld being negative in the direction of the least significant bit.

7. A method of synchronizing at least one user of a bus system that is operated with a preselectable system clock period, comprising:
preselecting a first local clock period and a reference clock period for the at least one user;
synchronizing the reference clock period with the preselectable system clock period;
generating another local clock period of the at least one user by linking the first local clock period to a scaling factor, the scaling factor reflecting a ratio of the reference clock period to the first local clock period;
synchronizing said another local clock period with the preselectable system clock period;
adapting the scaling factor to the system clock period by one of adding and subtracting an adjustment value; and
performing a plausibility check in such a way that at least one of the adjustment value, a sum of the adjustment value and the scaling factor, and a difference between the adjustment value and the scaling factor is compared with at least one preselectable threshold value.

8. The method as recited in claim 7, further comprising:
preselecting the at least one preselectable threshold value as a maximum value, wherein on at least one of reaching and exceeding the maximum value, one of the following occurs:
further synchronization by adapting the adjustment value is suppressed, and
at least one of the adjustment value and the sum of the adjustment value and the scaling factor is limited to the maximum value.

9. The method as recited in claim 7, further comprising:
preselecting the at least one preselectable threshold value as a minimum value, wherein on at least one of reaching and exceeding the minimum value, one of the following occurs:
further synchronization by adapting the adjustment value is suppressed, and
at least one of the adjustment value and the difference between the adjustment value and the scaling factor is limited to the minimum value.

10. A device for synchronizing at least one user of a bus system that is operated with a preselectable system clock period, comprising:
an arrangement for preselecting a first local clock period and a reference clock period for the at least one user;
an arrangement for synchronizing the reference clock period with the preselectable system clock period;
an arrangement for generating another local clock period of the at least one user by linking the first local clock period to a scaling factor, the scaling factor reflecting a ratio of the reference clock period to the first local clock period;
an arrangement for synchronizing said another local clock period with the preselectable system clock period; and
an arrangement for adapting the scaling factor to the system clock period by one of adding and subtracting an adjustment value.

11. A bus system, comprising:
a device for synchronizing at least one first user of the bus system, the bus system being operated with a preselectable system clock period;
a first arrangement for preselecting a first local clock period;
a second arrangement including a second user and for preselecting a reference clock period for the at least one first user, the reference clock period being synchronized with the system clock period;
a third arrangement for generating another local clock period, synchronized with the system clock period, of the at least one first user by linking the first local clock period with a scaling factor, the scaling factor reflecting a ratio of the reference clock period to the first local clock period; and
a fourth arrangement for adapting the scaling factor for synchronization of said another local clock period to the system clock period by one of an addition and a subtraction of an adjustment value.

12. The method of claim 1, wherein the adapting the scaling factor by one of adding and subtracting an adjustment value does not include a multiplication operation and does not include a division operation.

13. The method of claim 2, wherein the measurement time window is not constant.

* * * * *